(12) United States Patent
Bregman et al.

(10) Patent No.: US 11,663,082 B2
(45) Date of Patent: May 30, 2023

(54) VIRTUAL DISK IMAGE TESTING

(71) Applicant: Red Hat, Inc., Raleigh, NC (US)

(72) Inventors: Arie Bregman, Gan Yavne (IL); Ilan Gersht, Bat Yam (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/446,258

(22) Filed: Aug. 27, 2021

(65) Prior Publication Data

US 2023/0064426 A1 Mar. 2, 2023

(51) Int. Cl.
*G06F 11/14* (2006.01)
*G06F 11/07* (2006.01)
*G06F 3/06* (2006.01)

(52) U.S. Cl.
CPC .......... *G06F 11/1417* (2013.01); *G06F 3/067* (2013.01); *G06F 3/0619* (2013.01); *G06F 3/0652* (2013.01); *G06F 3/0665* (2013.01); *G06F 11/0772* (2013.01)

(58) Field of Classification Search
CPC ............. G06F 11/1417; G06F 11/0772; G06F 3/0619; G06F 3/0652
See application file for complete search history.

(56) References Cited

U.S. PATENT DOCUMENTS

| | | | |
|---|---|---|---|
| 8,893,279 B1* | 11/2014 | Chandrasekhar | G06F 21/562 726/24 |
| 9,009,705 B2* | 4/2015 | Kundu | G06F 8/63 718/1 |
| 9,658,871 B2 | 5/2017 | Adogla et al. | |
| 9,934,382 B2 | 4/2018 | Garcia | |
| 10,628,197 B2* | 4/2020 | Cao | G06F 9/45558 |
| 2020/0287795 A1 | 9/2020 | Maknojia et al. | |
| 2020/0326972 A1* | 10/2020 | Doane | G06F 9/45558 |

OTHER PUBLICATIONS

"Shielded VM", http://cloud.google.com/security/shielded-cloud/shielded-vm#measured-boot, last updated May 28, 2021, downloaded Jun. 4, 2021, 10 pages.
Red Hat Customer Portal, "Instances and Images Guide", http://access.redhat.com/documentation/en-us/red_hat_openstack_platform/16.1/html-single/instances_and_images_guide/index, 2021, 98 pages.

* cited by examiner

*Primary Examiner* — Nadeem Iqbal
(74) *Attorney, Agent, or Firm* — Lowenstein Sandler LLP

(57) ABSTRACT

Systems and methods for virtual disk image testing. An example method may comprise uploading a virtual disk image, by a requestor, to a cloud. Deploying a temporary instance of the uploaded virtual disk. Determining whether deployment of the temporary instance of the uploaded virtual disk image in the cloud is successful. Responsive to determining that the deployment of the temporary instance of the uploaded virtual disk image in the cloud is unsuccessful, flagging the uploaded virtual disk image as unbootable. Responsive to flagging the uploaded virtual disk image as unbootable, notifying the requestor that the uploaded virtual disk image is not submitted to a repository of the cloud.

17 Claims, 5 Drawing Sheets

VIRTUAL DISK IMAGE TESTING

TECHNICAL FIELD

The present disclosure is generally related to computer systems, and more particularly, to virtual disk image testing.

BACKGROUND

Cloud service provider is a third-party offering a cloud-based platform, infrastructure, applications, and/or storage services. Typically, cloud service providers provide clients with access to cloud repositories to store virtual disk images. Cloud repository is a storage location in the cloud where clients can store their data. Clients can utilize the cloud repository to share, backup, and restore virtual disk images. With the increase usage of cloud repository, cloud service providers are finding it increasingly important to provide administrators of the cloud access to monitor submission of virtual disk images.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
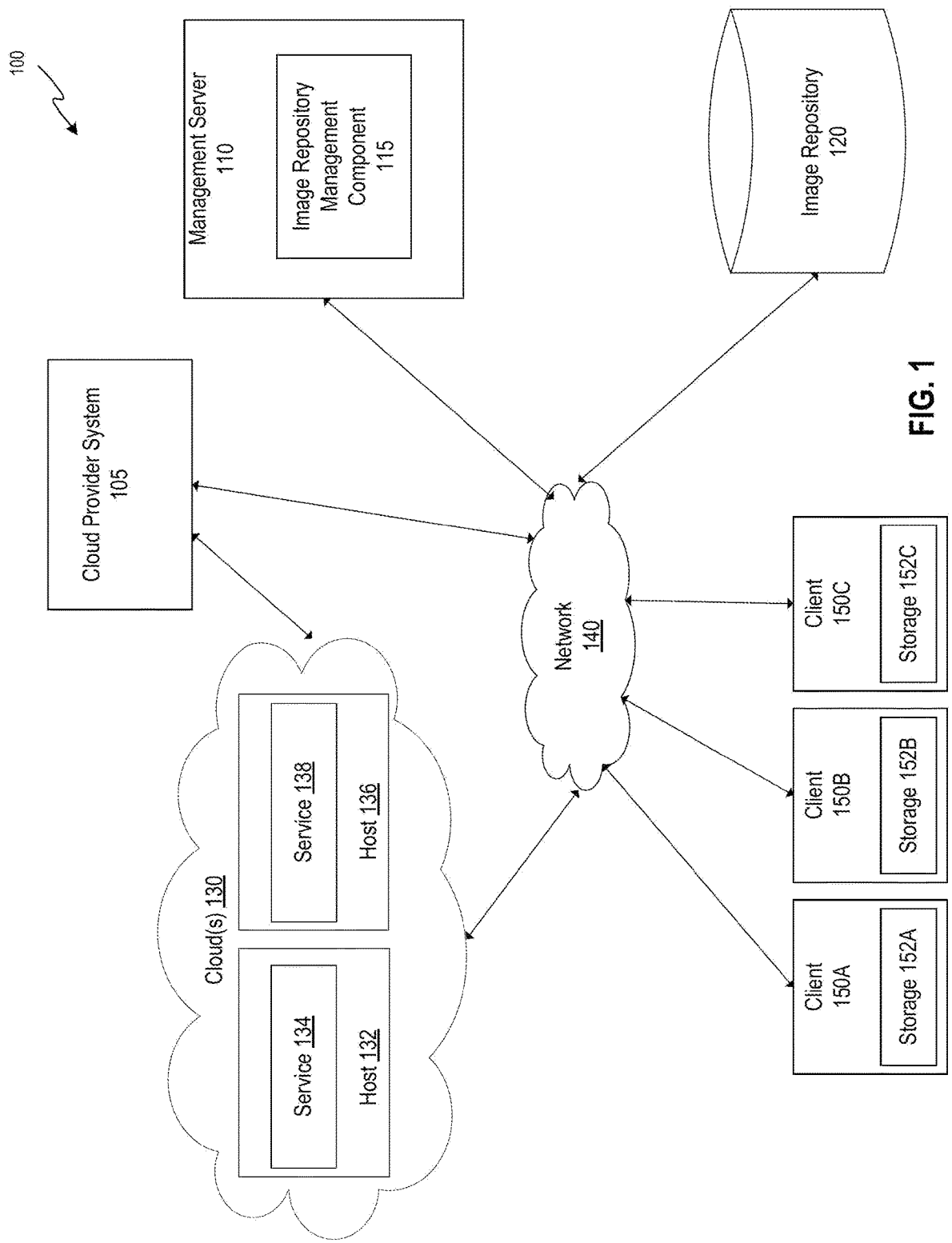
FIG. 1 depicts an exemplary system for testing a virtual disk image, in accordance with one or more aspects of the present disclosure.

Described herein are methods and systems for testing virtual disk images uploaded to a cloud. Examples of the present disclosure refer to cloud for simplicity. However, the disclosure may be applicable to other third party cloud-based infrastructure. A virtual disk image may be a file that contains an image of a virtual disk with a bootable operating system.

In certain implementations, a cloud provider may allow clients access a shared repository to upload virtual disk images to use exclusively or share with other clients of the cloud provider. In some instances, prior to upload of the virtual disk image to the repository, clients may test the virtual disk image to ensure the image is bootable and functional. However, during upload, the client may select the wrong version or inadvertently modify the virtual disk image in a manner that leaves the virtual disk image unbootable and non-functional. In other instances, virtual disk images are uploaded by a client without ensuring that the images are bootable. Accordingly, when other clients access the shared repository to use the virtual disk image they are left using a virtual disk image that is unbootable. As a result, clients would need to replace the unbootable virtual disk image with a bootable virtual disk image.

In some instances, simply replacing the unbootable virtual disk image with a bootable virtual disk image is not sufficient. Due to some clients utilizing extensive and complex automation and/or testing processes to use the uploaded virtual disk image, the client would need to roll back the processes implemented for the virtual disk image re-upload a bootable and/or functional virtual disk image to reconfigure the extensive complex automation and/or testing processes as a result introduces inefficiencies into the process. Typically, cloud providers do not provide any means for testing virtual disk images uploaded to a repository by their clients. Accordingly, the client would need to thoroughly test the virtual disk image prior to upload to ensure that the virtual disk image is bootable.

Aspects of the present disclosure address the above-noted and other deficiencies by providing, by the cloud provider, technology to test an uploaded virtual disk image with an actual instance of the uploaded virtual disk image thereby reducing the chances of uploading an unbootable and/or non-functional virtual disk image. In particular, aspects of the present disclosure provide technology that launches an instance of the uploaded virtual machine received by a client and determines whether the uploaded virtual disk image is bootable. In some embodiments, if the uploaded virtual disk image is bootable, the uploaded virtual disk image is made accessible by other clients. In other embodiments, if the uploaded virtual disk image is not bootable, the uploaded virtual disk image is flagged as unbootable (e.g., not working) and the client is provided with one or more options (e.g., canceling the virtual disk image upload, continue uploading the flagged virtual disk image, or modifying the flagged uploaded virtual disk image). Accordingly, by providing the client with an assurance that the uploaded virtual disk images has been tested and is bootable, the client can avoid utilizing unbootable and non-functional virtual disk images resulting less issues and increased efficiency for the clients utilizing the virtual disk image.

Various aspects of the above referenced methods and systems are described in details herein below by way of examples, rather than by way of limitation. The examples provided below discuss deploying, installing, running, and sharing of the draft web application may be performed by aspects of an instant messaging application, a host operating system, a virtual machine, or a combination thereof. In other examples, deploying, installing, running, and sharing of draft web applications may be performed in any suitable computer system that is absent of instant messaging application, host operating system, virtual machine discussed below.

FIG. 1 is a block diagram of a cloud architecture 100 in which embodiments of the invention may operate. The cloud architecture 100 may include a cloud 130 managed by various cloud provider systems 105. There may be any number of cloud(s) 130 and cloud provider systems 105. For brevity and simplicity, a cloud 130 is used as an example throughout this document. In an embodiment, the cloud architecture includes a cloud, and the cloud may be provided by a single cloud provider. The cloud 130 deploys services 134, 138. There may be any number of services 134, 138 being deployed in a cloud 130. For brevity and simplicity, a service 134, 138 in cloud 130 are used as an example in architecture 100. For example, cloud 130 deploys services 134, and cloud 140 deploys services 138.

Services 134, 138, as discussed herein, may refer to a computing resource, such as virtual machine instances, disk storage, memory, vCPUs, or networks, for example. Each service 134, 138 is hosted or enabled on a physical machine configured as part of the cloud 130. Such physical machines are often located in a data center. For example, services 134 are hosted on host 132 in cloud 130 provided by cloud provider systems 105 and services 138 are hosted on host 136 in cloud 130 provided by cloud provider systems 105.

The cloud provider systems 105 and cloud 130 may be provided as an infrastructure as a service (IaaS) layer. The cloud provider systems 105 and cloud 130 may be provided by, for example, a third party cloud provider or an organization including consumers of cloud 130. A cloud provider may provide more than one type of cloud provider system 105 and more than one type of cloud 130. The cloud provider may be an entity. An entity, as referred to here, may represent any person, a business organization such as a corporation, an educational institution such as a college or university, etc. Users (e.g., clients) may interact with applications executing on cloud-based virtual machines using client computer systems, such as clients 150A, 150B, 150C. Users may have one or more accounts associated with a cloud provider system 105.

Clients 150A, 150B, 150C are connected to hosts 132, 136 and cloud provider systems 105 via a network 140, which may be may be a private network (e.g., a local area network (LAN), a wide area network (WAN), intranet, or other similar private networks) or a public network (e.g., the Internet). Each client 150A, 150B, 150C having a corresponding storage 152A, 152B, 152C may be a mobile device, a PDA, a laptop, a desktop computer, or any other computing device. Each host 132, 136 may be a server computer system, a desktop computer or any other computing device. The cloud provider system 105 may include one or more machines such as server computers, desktop computers, etc.

In one embodiment, the cloud provider system 105 is coupled to a management server 110 via the network 140. The management server 110 may include an image repository management component 115, which may reside on the same machine or different machines (e.g., server computers, desktop computers, etc.). The management server 110 may be maintained by a cloud consumer of cloud 130 such as an enterprise (e.g., business, company, organization, etc.). In another embodiment, the management server 110 may be maintained by a third party cloud provider. In yet another embodiment, the management server 110 may be part of the cloud provider system 105.

The management server 110 may manage the deployment of services 134, 138 in the cloud 130. In some embodiments, the management server 110 may receive a request, for example, from a system administrator via a client 150A, 150B, 150C, describing a set of services 134, 138 to be deployed in the cloud 130. Depending on the embodiment, the request from the system administer via at least one of the client 150A, 150B, 150C may be a request to upload a virtual disk image stored in a corresponding storage 152A, 152B, 152C to the image repository 120 to provide the other clients access to the virtual disk image.

The repository 120 may reside locally or remotely, and may represent a single data structure or multiple data structures (databases, repositories, files, etc.) residing on one or more mass storage devices, such as magnetic or optical storage based disks, solid-state drives (SSDs) or hard drives. The request may define the requested service type, properties, and conditions, for example. Accordingly, based on the request to upload a virtual disk image, for example, the management server 110 accesses the repository 120 to store the virtual disk image received from the at least one client 150A, 150B, 150C. The image repository management component 115 verifies that the virtual disk image is intended to be bootable by analyzing the some information (e.g., virtual disk image metadata and/or inspection of the master boot record in a first sector of the virtual disk image) of the virtual disk image.

Upon uploading the virtual disk image to the repository 120 based on a request received by at least one of the clients 150A, 150B, 150C, the image repository management component 115 may deploy a service 134, 138 in the cloud 130. The image repository management component 115 attempts to create a temporary virtual machine instances (e.g., temporary instance) by booting the virtual disk image. For example, the service 134, 138 is a temporary virtual machine instances (e.g., temporary instance) based on the virtual disk image being uploaded to the repository 120. The image repository management component 115 may determine whether the virtual disk image is bootable and/or functional based on the status of the temporary instance. To determine whether the virtual disk image is bootable and/or functional, the image repository management component 115 verifies that the temporary instance is up and running. The image repository management component 115 may further inspect log files of the temporary instance to determine if there were any critical errors. In some embodiments, the image repository management component 115 may inspect the temporary instance to determine if the temporary instance is responsive.

In some embodiments, the image repository management component 115 may set a predefined time period to wait for the temporary instance to boot up. For example, the image repository management component 115 attempts to boot the virtual disk image in the virtual instance and if the virtual instance does not respond within the predefined time period the virtual disk image is marked as unbootable. In some embodiment, the image repository management component 115 may set a predefined time period to determine if the virtual disk image is functional, for example, after the virtual instance boots and runs, if the virtual instance exhibits critical errors and shutdown (e.g., terminates shortly after startup) the image repository management component 115 marks the virtual disk image as unbootable and/or non-functional.

The image repository management component 115 may further flag (e.g., mark) the virtual disk image as unbootable and/or non-functional if the temporary instance was unsuccessful. In some embodiments, based on the critical Further, the image repository management component 115 may prompt the at least one of the clients 150A, 150B, 150C that uploaded the virtual disk image to cancel submission, upload the flagged virtual disk image, or modify the virtual disk image prior to submission. The image repository management component 115 is further described below.

Figure 2:
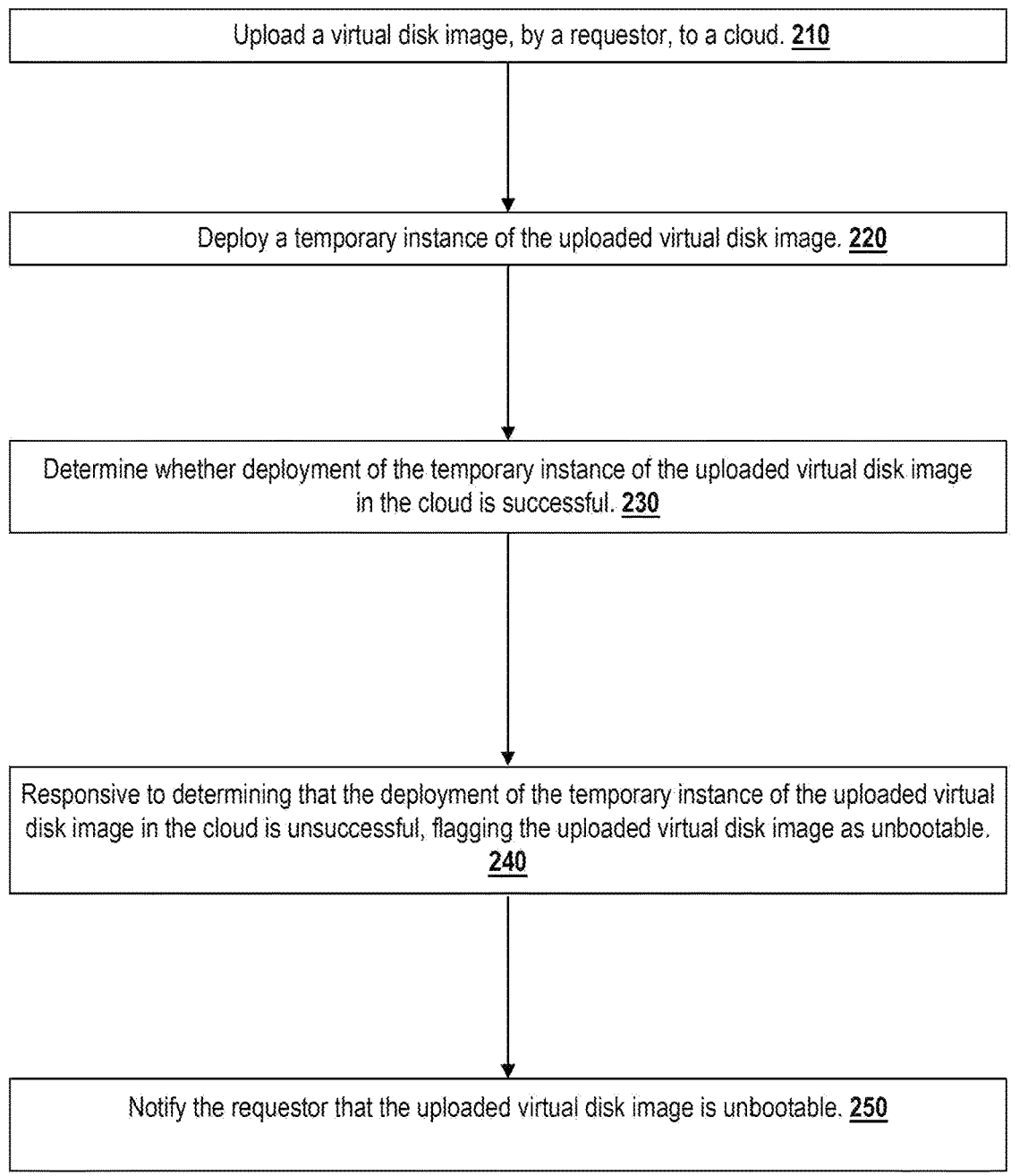
FIG. 2 depicts a flow diagram of an example method for testing a virtual disk image, in accordance with one or more aspects of the present disclosure.

FIG. 2 depicts a flow diagram of an illustrative example of a method 200 for testing a virtual disk image uploaded to a cloud, in accordance with one or more aspects of the present disclosure. Method 200 and each of its individual functions, routines, subroutines, or operations may be performed by one or more processors of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 200 may be performed by processing devices of a server device or a client device and may begin at block 210.

At block 210, the processing device uploads a virtual disk image, by a requestor (e.g., client), to a cloud. As described previously, a client send a request to upload the virtual disk image to the image repository. Upon receiving the request to upload the virtual disk image, the virtual disk image is uploaded to the cloud but not uploaded to the repository of the cloud to be made available to other users (e.g., clients). In some instances, the virtual disk image is uploaded to the repository but hidden from other users (e.g., clients).

At block 220, the processing device deploys a temporary instance of the uploaded virtual disk. The temporary instance of the virtual disk image refers to an instance deployed in the cloud with resources of the requestor to boot up the virtual disk image. As described previously, the processing device attempts to create a temporary virtual machine instances (e.g., temporary instance) by booting the virtual disk image being uploaded to the repository.

At block 230, the processing device determines whether deployment of the temporary instance of the uploaded virtual disk image in the cloud is successful. To determine whether the temporary instance of the uploaded image in the cloud is successful, the processing device determines whether the temporary instances has reached the console. In some embodiments, the processing device may include additional virtual machine instances tools to assess the functionality of the temporary instance. Accordingly, the processing device can determined whether the temporary instance is successful based on whether or not the temporary instance is bootable or whether or not the temporary instance is functional despite being bootable.

To determine whether or not the temporary instance is bootable or functional, the processing device verifies that the temporary instance is up and running. The processing device may further inspect log files of the temporary instance to determine if there were any critical errors or assess whether the temporary instance is responsive.

At block 240, responsive to determining that the deployment of the temporary instance of the uploaded virtual disk image in the cloud is unsuccessful, the processing device flags the uploaded virtual disk image as unbootable and/or non-functional. To flag the virtual disk image as unbootable and/or non-functional, each virtual disk image may include a bit flag indicating whether or not the virtual disk image is bootable and/or functional. Accordingly, the processing device updates the bit flag associated with the virtual disk image.

At block 250, responsive to flagging the uploaded virtual disk image as unbootable, the processing device notifies the requestor that the uploaded virtual disk image is not submitted to a repository of the cloud. In an embodiment, once notified, the processing logic receives, from the requestor, a command to cancel submission of the uploaded virtual disk image. Responsive to receiving the command, the processing logic destroys the temporary instance of the uploaded virtual disk image and deletes the uploaded virtual disk image from the cloud.

In another embodiment, once notified, the processing device receives, from the requestor, a command to continue with submission of the uploaded virtual disk image. Responsive to receiving the command to continue with submission of the uploaded virtual disk image, the processing device submits the flagged uploaded virtual disk image to the repository of the cloud and destroys the temporary instance of the uploaded virtual disk image.

In yet another embodiment, once notified, the processing device receives, from the requestor, a command to modify the uploaded virtual disk image prior to submission of the uploaded virtual disk image. Responsive to receiving the command to modify the uploaded virtual disk image prior to submission of the uploaded virtual disk image, the processing device identifies at least one error associated with the temporary instance of the flagged uploaded virtual disk image and provides, the requestor, access to the uploaded virtual disk image to modify the at least one error. Once the requestor modifies the at least one error, the processing device tests the modified uploaded virtual disk image by booting the modified uploaded virtual disk image in the temporary instance, and determining whether the temporary instance of the modified uploaded virtual disk image is successful.

In some embodiments, once notified, the processing device prompts the requestor of the uploaded virtual disk image to perform an action of a plurality of actions to determine whether to continue submission of the uploaded virtual disk image or cancel submission of the uploaded virtual disk. The plurality of actions includes cancelling the submission of the uploaded virtual disk image, continuing with submission of the uploaded virtual disk image, or modifying the uploaded virtual disk image.

Responsive to completing the operations described herein above with references to block 250, the method may terminate.

Figure 3:
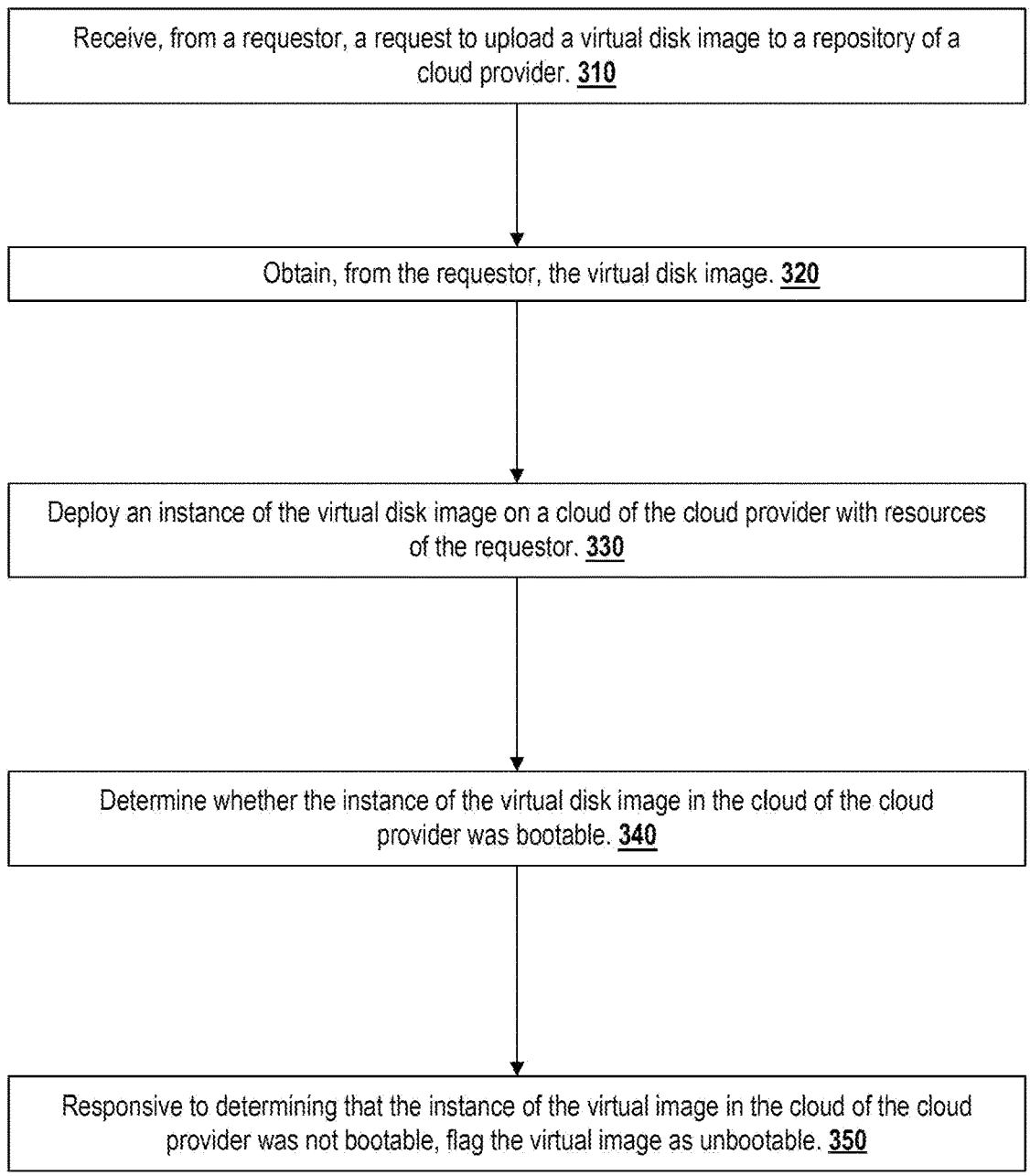
FIG. 3 depicts a flow diagram of an example method for testing a virtual disk image, in accordance with one or more aspects of the present disclosure.

FIG. 3 depicts a flow diagram of an illustrative example of a method 300 for testing a virtual disk image uploaded to a cloud, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 300 may be performed by processing devices of a server device or a client device and may begin at block 310.

At block 310, the processing device receives, from a requestor, a request to upload a virtual disk image to a repository of a cloud provider. Upon receiving the request to upload the virtual disk image, the virtual disk image is not uploaded to the repository to be made available to other users (e.g., clients). In some instances, the virtual disk image is uploaded to the repository but hidden from other users (e.g., clients).

At block 320, the processing device obtains, from the requestor, the virtual disk image. Responsive to obtaining the virtual disk image, at block 330, the processing device deploys an instance of the virtual disk image on a cloud of the cloud provider with resources of the requestor. The temporary instance of the virtual disk image refers to an instance deployed in the cloud with resources of the requestor to boot up the virtual disk image. As described previously, the processing device attempts to create a temporary virtual machine instances (e.g., temporary instance) by booting the virtual disk image being uploaded to the repository.

At block 340, the processing device determines whether the instance of the virtual disk image in the cloud of the cloud provider was bootable. As described previously, to determine whether the temporary instance of the uploaded image in the cloud is successful, the processing device determines whether the temporary instances has reached the console. In some embodiments, the processing device may include additional virtual machine instances tools to assess the functionality of the temporary instance. Accordingly, the processing device can determined whether the temporary instance is successful based on whether or not the temporary instance is bootable or whether or not the temporary instance is functional despite being bootable. As descried previously, to determine whether or not the temporary instance is bootable or functional, the processing device verifies that the temporary instance is up and running. The processing device may further inspect log files of the temporary instance to determine if there were any critical errors or assess whether the temporary instance is responsive.

At block 350, responsive to determining that the instance of the virtual disk image in the cloud of the cloud provider was not bootable, the processing device flags the virtual disk image as unbootable. As described previously, to flag the virtual disk image as unbootable and/or non-functional, each virtual disk image may include a bit flag indicating whether or not the virtual disk image is bootable and/or functional. Accordingly, the processing device updates the bit flag associated with the virtual disk image.

In an embodiment, responsive to flagging the virtual disk image as unbootable, the processing logic, determines whether to process the request to upload the virtual disk image to the repository of the cloud provider based on an action of the requestor to perform one of: cancel the upload, continue the upload, or modify the virtual disk image. Responsive to processing the request to upload the virtual disk image, the processing device destroys the instance of the virtual disk image in the cloud of the cloud provider.

Responsive to completing the operations described herein above with references to block 350, the method may terminate.

Figure 4:
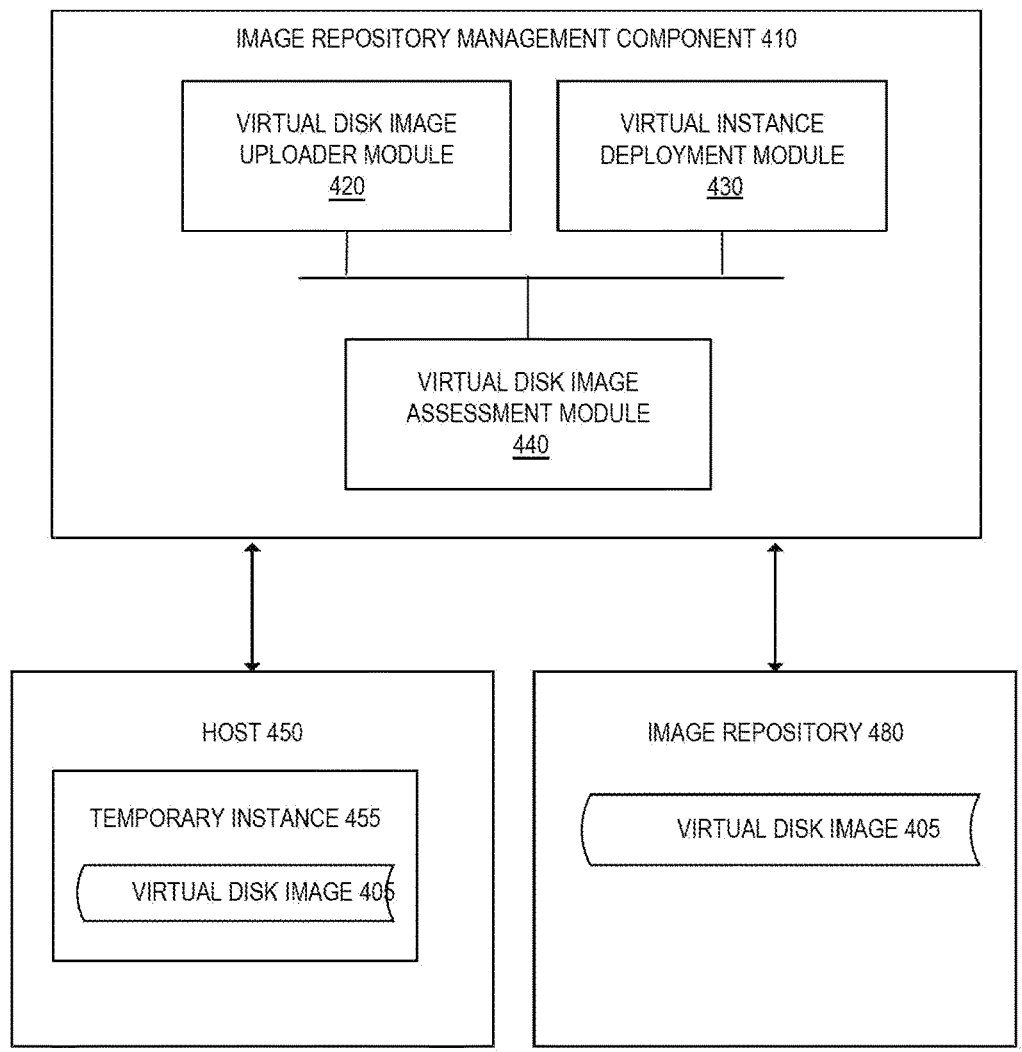
FIG. 4 depicts a block diagram of an example system in accordance with one or more aspects of the present disclosure.

FIG. 4 depicts a block diagram of a system 400 operating in accordance with one or more aspects of the present disclosure. System 400 may be the same or similar to the system 100 and may include one or more processing devices and one or more memory devices. In the example shown, system 400 may include an image repository management component 410 a virtual disk image uploader module 420, a virtual instance deployment module 430, and a virtual disk image assessment module 440.

Virtual disk image uploader module 420 may receive a virtual disk image 405 from a storage 152A of a client 150A for upload to the image repository 480 of the cloud(s) 130 of the cloud architecture 100 to provide access to other client(s) 150B and 150C. The virtual disk image uploader module 420 obtains the virtual disk image 405 from storage 152A of client 150A. Upon receiving the request to upload the virtual disk image 405, the virtual disk image 405 is not uploaded to image repository 480 to be made available to the other client(s) 150B and 150C. In some instances, the virtual disk image 405 is uploaded to image repository 480 but hidden from the other client(s) 150B and 150C.

Virtual instance deployment module 430 deploying a temporary instance 455 of the uploaded virtual disk. The temporary instance 455 of the virtual disk image 405 refers to a service 134 (e.g., a virtual machine instance) deployed on host 450 in the cloud 130 with resources of client 150A to boot up the virtual disk image 405. For example, as described previously, the virtual instance deployment module 430 attempts to create a temporary virtual machine instances (e.g., temporary instance) by booting the virtual disk image being uploaded to the repository.

Virtual disk image assessment module 440 may determine whether deployment of the temporary instance 455 of the uploaded virtual disk image 405 in the cloud is successful. To determine whether the temporary instance 455 of the uploaded image in the cloud 130 is successful, the virtual disk image assessment module 440 determines whether the temporary instances has reached the console. In some embodiments, the virtual disk image assessment module 440 includes virtual machine instances tools to assess the functionality of the temporary instance. Accordingly, the virtual disk image assessment module 440 can determine whether the temporary instance 455 is successful based on whether or not the temporary instance 455 is bootable or whether or not the temporary instance 455 is functional despite being bootable. As descried previously, to determine whether or not the temporary instance is bootable or functional, the virtual disk image assessment module 440 verifies that the temporary instance is up and running. The virtual disk image assessment module 440 may further inspect log files of the temporary instance to determine if there were any critical errors or assess whether the temporary instance is responsive.

Responsive to determining that the deployment of the temporary instance 455 of the uploaded virtual disk image 405 in the cloud is unsuccessful, the virtual disk image assessment module 440 may flag the uploaded virtual disk image 405 as unbootable. To flag the virtual disk image 405 as unbootable and/or non-functional, the virtual disk image assessment module 440 updates a bit flag associated with metadata and/or payload of the virtual disk image 405 indicating whether or not the virtual disk image 405 is bootable and/or functional. Accordingly, the virtual disk image assessment module 440 updates the bit flag associated with the virtual disk image 405. Responsive to flagging the uploaded virtual disk image 405 as unbootable, the virtual disk image assessment module 440 may notify client 150A that the uploaded virtual disk image 405 that the virtual disk image 405 is not submitted to repository 120 of the cloud 130.

Figure 5:
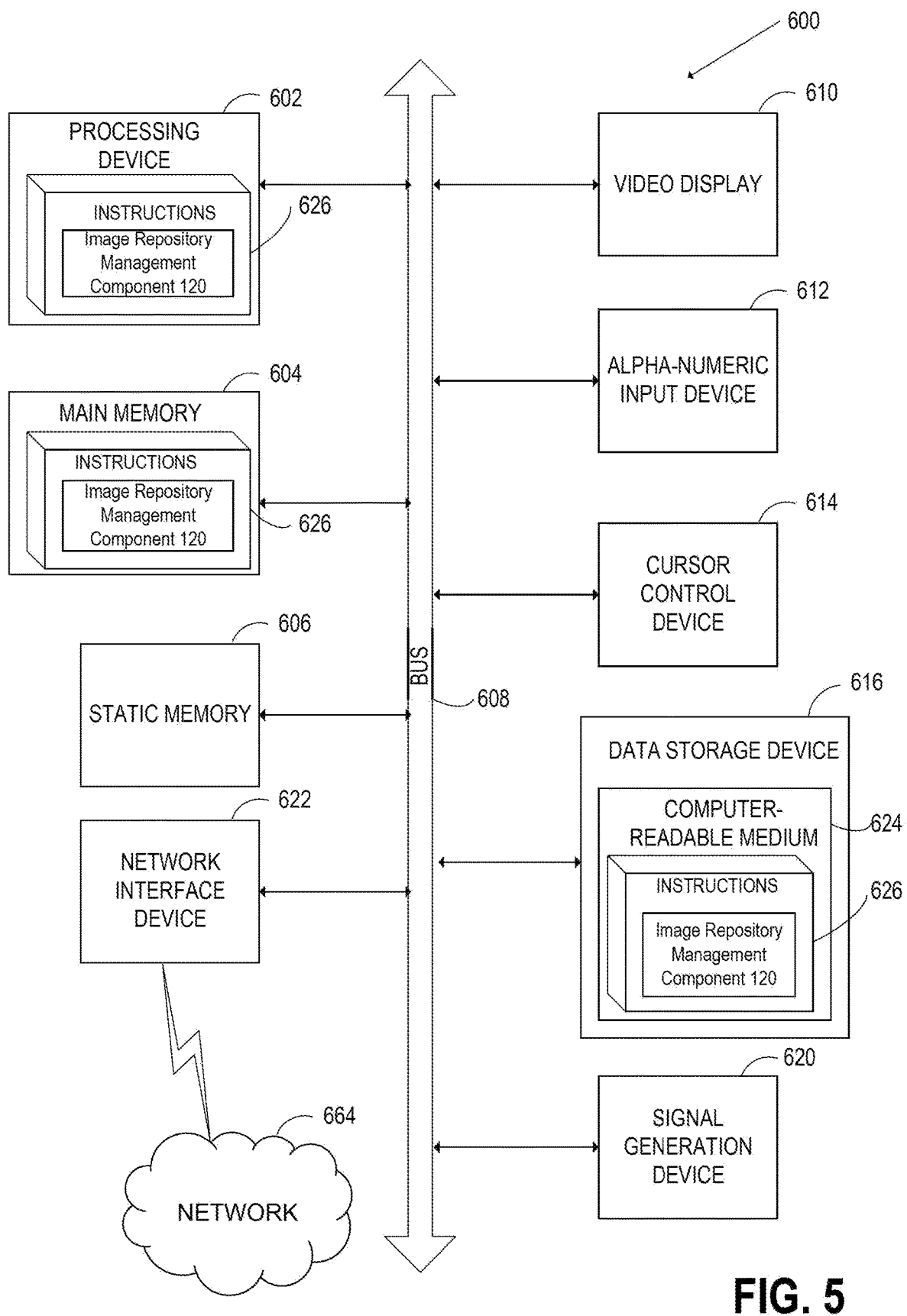
FIG. 5 depicts a block diagram of an illustrative computing device operating in accordance with the examples of the present disclosure.

FIG. 5 illustrates an example machine of a computer system 600 within which a set of instructions, for causing the machine to perform any one or more of the methodologies discussed herein, can be executed. In some embodiments, the computer system 600 can correspond to an instant messaging server (e.g., the messaging service 110 of FIG. 1) that can be used to perform the operations corresponding to the web application deployment component 115 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media.

In one embodiment, the instructions 626 include instructions to implement functionality corresponding to a web application deployment component (e.g., the web application deployment component 115 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   uploading a virtual disk image, by a requestor, to a cloud;
   deploying a temporary instance of the uploaded virtual disk image;
   determining whether deployment of the temporary instance of the uploaded virtual disk image in the cloud is successful;
   responsive to determining that the deployment of the temporary instance of the uploaded virtual disk image in the cloud is unsuccessful, flagging the uploaded virtual disk image as unbootable;
   notifying the requestor that the uploaded virtual disk image is unbootable;
   receiving, from the requestor, a command to cancel submission of the uploaded virtual disk image;
   destroying the temporary instance of the uploaded virtual disk image; and
   deleting the uploaded virtual disk image from the cloud.

2. The method of claim 1, further comprising:
   receiving, from the requestor, a command to continue with submission of the uploaded virtual disk image;
   submitting the uploaded virtual disk image, flagged as unbootable, to the repository of the cloud; and
   destroying the temporary instance of the uploaded virtual disk image.

3. The method of claim 1, further comprising:
   receiving, from the requestor, a command to modify the uploaded virtual disk image prior to submission of the uploaded virtual disk image;
   identifying at least one error associated with the temporary instance of the uploaded virtual disk image; and
   providing, the requestor, access to the uploaded virtual disk image to modify the at least one error.

4. The method of claim 3, further comprising:
   booting the modified uploaded virtual disk image in a second temporary instance; and
   determining whether creating the second temporary instance of the modified uploaded virtual disk image is successful.

5. The method of claim 1, wherein the temporary instance of the virtual disk image is an instance deployed in the cloud with resources of the requestor to boot up the virtual disk image.

6. The method of claim 1, further comprising:
   prompting the requestor to perform an action of a plurality of actions to determine whether to continue submission of the uploaded virtual disk image or cancel submission of the uploaded virtual disk.

7. The method of claim 6, wherein the plurality of actions is one of:
   cancel the submission of the uploaded virtual disk image, continue with submission of the uploaded virtual disk image, or modify the uploaded virtual disk image.

8. A system comprising:
   a memory; and
   a processing device coupled to the memory, to perform operations comprising:
   uploading a virtual disk image, by a requestor, to a cloud;
   deploying a temporary instance of the uploaded virtual disk image;
   determining whether deployment of the temporary instance of the uploaded virtual disk image in the cloud is successful;
   responsive to determining that the deployment of the temporary instance of the uploaded virtual disk image in the cloud is unsuccessful, flagging the uploaded virtual disk image as unbootable;
   notifying the requestor that the uploaded virtual disk image is unbootable;
   receiving, from the requestor, a command to continue with submission of the uploaded virtual disk image;
   submitting the uploaded virtual disk image, flagged as unbootable, to the repository of the cloud; and
   destroying the temporary instance of the uploaded virtual disk image.

9. The system of claim 8, wherein the operations further comprises:
   receiving, from the requestor, a command to cancel submission of the uploaded virtual disk image;
   destroying the temporary instance of the uploaded virtual disk image; and
   deleting the uploaded virtual disk image from the cloud.

10. The system of claim 8, wherein the operations further comprises:
    receiving, from the requestor, a command to modify the uploaded virtual disk image prior to submission of the uploaded virtual disk image;
    identifying at least one error associated with the temporary instance of the uploaded virtual disk image; and
    providing, the requestor, access to the uploaded virtual disk image to modify the at least one error.

11. The system of claim 10, wherein the operations further comprises:
    booting the modified uploaded virtual disk image in a second temporary instance; and determining whether creating the second temporary instance of the modified uploaded virtual disk image is successful.

12. The system of claim 8, wherein the temporary instance of the virtual disk image is an instance deployed in the cloud with resources of the requestor to boot up the virtual disk image.

13. The system of claim 8, wherein the operations further comprises:
prompting the requestor to perform an action of a plurality of actions to determine whether to continue submission of the uploaded virtual disk image or cancel submission of the uploaded virtual disk.

14. The system of claim 13, wherein the plurality of actions is one of: cancel the submission of the uploaded virtual disk image, continue with submission of the uploaded virtual disk image, or modify the uploaded virtual disk image.

15. A non-transitory machine-readable storage medium including instructions that, when accessed by a processing device, cause the processing device to:
receive, from a requestor, a request to upload a virtual disk image to a repository of a cloud provider;
obtain, from the requestor, the virtual disk image;
deploy an instance of the virtual disk image on a cloud of the cloud provider with resources of the requestor;
determine whether the instance of the virtual disk image in the cloud of the cloud provider was bootable;
responsive to determining that the instance of the virtual disk image in the cloud of the cloud provider was not bootable, flag the virtual disk image as unbootable; and
determine whether to process the request to upload the virtual disk image to the repository of the cloud provider based on an action of the requestor to perform one of: cancel the submission of the uploaded virtual disk image, continue with submission of the uploaded virtual disk image, or modify the uploaded virtual disk image.

16. The non-transitory machine-readable storage medium of claim 15, wherein uploading the virtual disk image to the repository of the cloud provider includes making the virtual disk image accessible those other than the requestor.

17. The non-transitory machine-readable storage medium of claim 15, wherein determining to process the request to upload the virtual disk image to the repository of the cloud provider includes destroying the instance of the virtual disk image in the cloud of the cloud provider.

* * * * *